(12) United States Patent
Dundon

(10) Patent No.: US 6,253,257 B1
(45) Date of Patent: Jun. 26, 2001

(54) SOFTWARE INTERFACE FOR DYNAMIC API MAPPING

(75) Inventor: Jack P. Dundon, San Diego, CA (US)

(73) Assignee: BEA Systems, Inc., Sunnyvale, CA (US)

( * ) Notice: Subject to any disclaimer, the term of this patent is extended or adjusted under 35 U.S.C. 154(b) by 0 days.

(21) Appl. No.: 08/904,401

(22) Filed: Jul. 31, 1997

(51) Int. Cl.[7] .................................. G06F 9/00; G06F 9/46
(52) U.S. Cl. ................................... 709/331; 709/328
(58) Field of Search .................................. 395/682, 685, 395/712; 709/300–305, 310–323

(56) References Cited

U.S. PATENT DOCUMENTS

| | | | | |
|---|---|---|---|---|
| 5,097,533 | * | 3/1992 | Burger et al. | 709/302 |
| 5,291,601 | * | 3/1994 | Sands | 395/700 |
| 5,410,698 | * | 4/1995 | Danneels et al. | 395/650 |
| 5,471,615 | * | 11/1995 | Amatsu et al. | 395/200.03 |
| 5,544,316 | * | 8/1996 | Carpenter et al. | 709/300 |
| 5,606,702 | * | 2/1997 | Diel et al. | 395/682 |
| 5,659,751 | * | 8/1997 | Heninger | 395/685 |
| 5,734,871 | * | 3/1998 | Kleinerman et al. | 709/302 |
| 5,734,904 | * | 3/1998 | Kanamori et al. | 395/685 |
| 5,774,720 | * | 6/1998 | Borgendale | 395/682 |
| 5,819,090 | * | 10/1998 | Wolf et al. | 395/682 |
| 5,832,274 | * | 11/1998 | Cutler et al. | 395/712 |
| 5,872,973 | * | 2/1999 | Mitchell et al. | 709/305 |

OTHER PUBLICATIONS

NCR, TOP END Product Overview, Jan. 1996.*
NCR, TOP END on Windows NT, Feb. 1997.*
NCR, Accessing TOP END over the Intranet, Internet, Jul. 1996.*

* cited by examiner

*Primary Examiner*—Majid Banankhah
*Assistant Examiner*—P. Caldwell
(74) *Attorney, Agent, or Firm*—Fliesler Dubb Meyer & Lovejoy LLP

(57) ABSTRACT

A method, apparatus, and article of manufacture for a software interface for dynamic API mapping. The method comprises the steps of identifying the libraries required by the API by determining which program environment the API is operating in, scanning to detect and select libraries available to the determined program environment, dynamically loading the selected libraries, dynamically loading the selected libraries into the application, and binding the selected libraries to the associated API function call.

The present invention allows a single binary application to transparently work with different libraries that provide a common or overlapping API set. This is accomplished by linking the application with a separate library that provides a dynamic API mapping facility. A function in this library is invoked when the application begins execution. The application's system is scanned to determine which libraries are available. If more than one choice is available, the dynamic API mapping facility will heuristically determine which library or libraries to use. An environment variable can also be used to force the application to use a specific set of libraries when more than one choice is available. When an appropriate library is determined, it is dynamically loaded into the process, and scanned for each supported API function. When a function is found, a pointer to that function will be bound to a global function pointer named to reflect the corresponding API. Each function pointer has as its default value, a pointer to a default function that returns an appropriate error if called. Once each of the API functions has been mapped, the application can run without the need to be aware of the different libraries to which it is linked. The same binary application can run on a system with any library or set of libraries that provides the appropriate API set.

10 Claims, 4 Drawing Sheets

SOFTWARE INTERFACE FOR DYNAMIC API MAPPING

CROSS-REFERENCE TO RELATED APPLICATIONS

This application is related to application Ser. No. 08/904,406, now abandoned, entitled "SOFTWARE INTERFACE ADAPTER FOR USE WITH MULTIPLE DEVELOPMENT TOOLS," filed on same date herewith, by Jack P. Dundon and Matthew L. Courtois, which application is incorporated by reference herein.

BACKGROUND OF THE INVENTION

1. Field of the Invention

This invention relates in general to networked computer applications, and in particular to an method and apparatus for dynamically mapping application program interfaces.

2. Description of Related Art

An important trend in the industry is the development of client/server architectures in distributed computing environments to support transaction processing applications. Currently, distributed computing environments typically comprise interconnected mainframes, minicomputers, servers, and workstations. Libraries implemented in the client/server architecture are used by the client/server applications, usually through application program interfaces (APIs) designed for use with "C" or other programming languages, to respond to commands and perform application functions. In general, these libraries may be resident on all of the nodes in the client/server architecture within a networked environment.

One advantage of the distributed client/server architecture is the ability to support different application environments. This feature is particularly useful in providing services to remote users because in some cases, hardware, communications, data access, cost, or other limitations, may require these remote users to implement reduced functionality, or "lightweight," versions of the applications supported by the client/server architectures. A client/server architecture is thus presented with two application environments, the runtime environment of the full functionality user, and the remote environment of the limited functionality user.

The dual-environment capabilities of the client-server architecture presents unique problems. One of these problems is that the libraries that contain the runtime APIs are different from the libraries that contain remote APIs. In addition, there may be several APIs that are not supported in the remote API set. This situation prevents applications from running transparently using either runtime APIs or remote APIs.

The traditional solution to the problems presented by the dual environment is to produce two separate binary applications, one linked with each set of libraries. However, a single executable binary application should be able to run using either API set without requiring the application to be linked with the specific libraries at compile-time. The present application satisfies that need by dynamically linking with the appropriate libraries and binding the appropriate APIs at run-time, thus allowing a single application to operate in the dual environment.

SUMMARY OF THE INVENTION

The present invention discloses a method, apparatus, and article of manufacture for a software interface for dynamic API mapping. The method comprises the steps of identifying the libraries required by the API by determining which program environment the API is operating in, scanning to detect and select libraries available to the determined program environment, dynamically loading the selected libraries into the application, and binding the selected libraries to the associated API function call.

The present invention allows a single binary application to transparently work with different libraries that provide a common or overlapping API set. This is accomplished by linking the application with a separate library that provides a dynamic API mapping facility. A function in this library is invoked when the application begins execution. The application's system is scanned to determine which libraries are available. If more than one choice is available, the dynamic API mapping facility will heuristically determine which library or libraries to use. An environment variable can also be used to force the application to use a specific set of libraries when more than one choice is available. When an appropriate library is determined, it is dynamically loaded into the process, and scanned for each supported API function. When a function is found, a pointer to that function will be bound to a global function pointer named to reflect the corresponding API. Each function pointer has as its default value, a pointer to a default function that returns an appropriate error if called. Once each of the API functions has been mapped, the application can run without the need to be aware of the different libraries to which it is linked. The same binary application can run on a system with any library or set of libraries that provides the appropriate API set.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Figure 1:
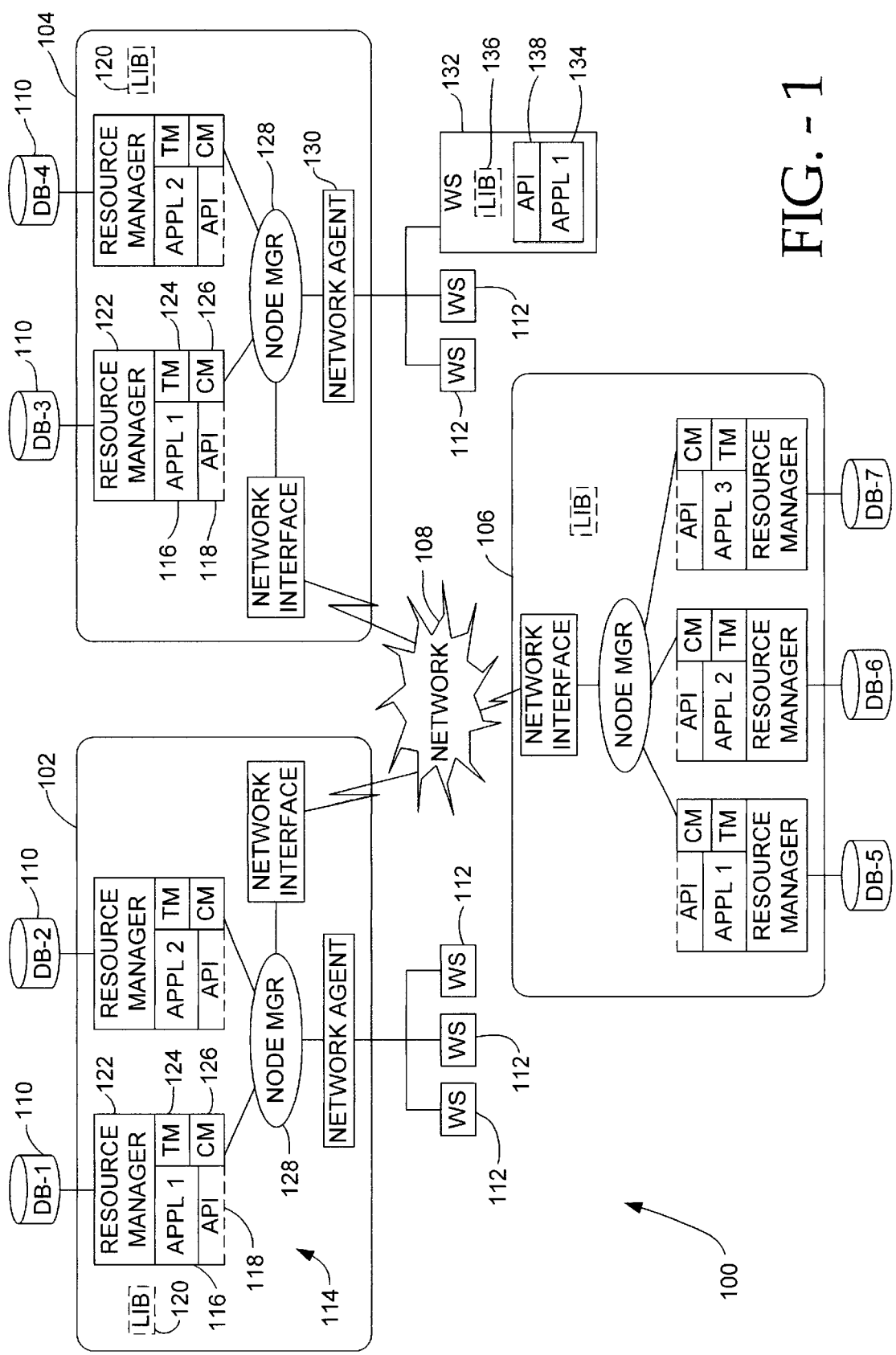
FIG. 1 is an exemplary illustration of a distributed computing environment known as a TOP END™ system.

FIG. 1 is an exemplary illustration of a distributed computing environment 100, known as a TOP END™ system. A TOP END system 100 is comprised of one or more nodes 102, 104, 106 interconnected by a network 108, wherein each of the nodes 102, 104, 106 normally comprises one computer. Each of the nodes 102, 104, 106 is typically coupled to one or more fixed and/or removable data storage units (DSUs) 110, such as disk drives, that store one or more databases.

In the client-server architecture of the present invention, a particular node may operate as a server node one or more client nodes, while at the same time, operate as a client node to one or more server nodes. In the exemplary embodiment of FIG. 1, node 102 operates as a client node and node 106 is a server node. Client node 102 provides a connection to client systems operating on workstations 112. Operators of the TOP END system 100 use a workstation 112 or terminal to transceive electrical signals to and from server systems operating on the nodes 102, 104, 106 in the TOP END system 100, wherein the electrical signals represent commands for performing various functions in the TOP END system 100, such as search and retrieval functions against the databases and the responses to these commands. The present invention has application to any function or software that can be performed by a TOP END system 100.

According to the present invention, these functions are divided into several modular components 114 that are designed for a distributed, message-passing computing environment. In TOP END terminology, a "component" 114 is a process or logical group of processes that performs one or more functions. The components 114 work together to process distributed transactions initiated by the client systems.

Work is divided among the nodes 102, 104, 106 in the TOP END system 100 by spreading the location of these modular components 114 across the nodes 102, 104, 106. Thus, each node 102, 104, 106 performs some localized function and work is managed by the system 100 so that a sequence of multiple functions comprising a client request is performed by one or more of the modular components on one or more of the nodes 102, 104, 106 in the system 100.

The fundamental component in the TOP END system 100 is the application component 114. Application components 114 are used to create and grow distributed TOP END systems 100. Application components 114 can be user-written, provided as a solution by an independent vendor, or supplied as part of the TOP END system 100. Generally, each application component 114 comprises one or more applications 116 and an application program interface 118 which supports linking and binding the application 116 with the libraries 120 available at the node 102, thus providing a comprehensive set of services and run-time libraries 120 to the application component 114, including resource managers 122 such as database management systems (DBMS), transaction managers 124, communications managers 126.

Another component of a TOP END system 100 is the node manager 128. The node manager 128 is a collection of processes that offer core services to coordinate processing among nodes 102, 104, 106. These processes, in general, work independently of each other. Services provided by the node manager 128 include transaction management (for example, commit coordination), logging, failure recovery, client/server request handling, security management, runtime administration, and application component 114 control. One of the transaction management services provided by the node manager 128 is Recoverable Transaction Queuing (RTQ), which prioritizes transaction requests such that the requests will be performed when the system 100 is able to perform the request.

Another component of a TOP END system 100 is the network agents 130. Network agents 130 are used to allow transactions and service requests to enter a TOP END system 100 from an application component 114 or networked workstation 112 that does not have a node manager 128 on it.

The TOP END system 100 also provides a myriad of tools for managing the distributed computing environment. More specifically, a TOP END system 100 provides a full range of graphical, menu-based administrative tools that make it easy to manage distributed computing environments. The systems administration tools are used to perform component start-up and shutdown, manage auditing and recovery, activate communication links, perform automatic software distribution, and so on.

For high availability reasons, there are two levels of administration provided: global and single node. Global administration provides a single operational view of the TOP END system 100 allowing administrators to control all nodes 102, 104, 106 from a single workstation 112. For certain failure situations, however, single node systems administration can be used to accomplish controlled administration on a node-by-node basis.

One feature of the distributed client/server processing capabilities of the present invention is the ability to support multiple application environments, including a full capability environment (or run-time environment) with a full capability application component 114 and associated application 116 (denoted APPL 1) and a remote environment with different, and generally lesser-capable remote "lightweight" application 134 (denoted APPL 1). In one embodiment, the full capability application component provides the user with a full range of functionality and capabilities. The remote application component 134 provides the user with a different (and usually lesser) capability which is particularly useful where hardware, communications, data access, cost, or other limitations are at issue. The remote application environment can be implemented at the first node 102 or a second node 104, but is generally implemented in remote node 132. Although described herein as a lesser capability application component, remote application component 134 may generally be more or less capable than application component 116, because the present invention allows components of different capabilities to be integrated in the distributed client server environment.

One consequence of this dual environment is that the TOP END libraries that the application needs to execute are different for each environment, and normally must be determined on a per-executable basis. For example, a remote library or library set 136 and API 138 in the remote node 132 is available to the remote environment to support API functions in the remote node 132. The present invention uses a dynamic API mapping facility to automatically detect TOP END libraries (run-time or remote) that it should use, load the necessary libraries, and bind to the appropriate API functions at runtime, thereby allowing a common application to operate in either the TOP END runtime or the remote environment. The dynamic API mapping facility is executed by a computer under the control of an operating system, such as Windows NT™. The computer may be a workstation 112 or a node 102, 104, 106 connected to the network 100.

Figure 2:
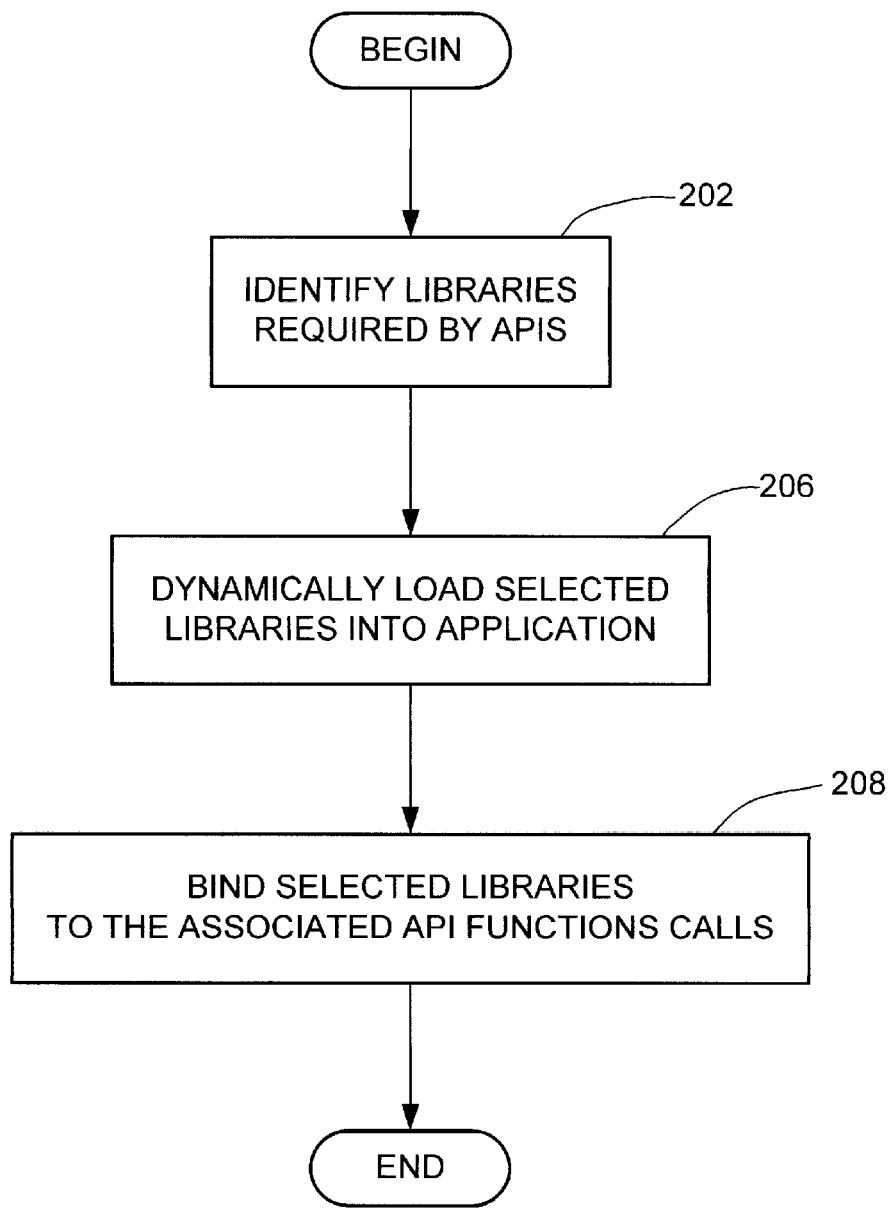
FIG. 2 is a flow chart illustrating the operations performed in the present invention.

FIG. 2 is a flow chart describing the operations performed in the present invention. The process begins when an executed application 116, 134 calls a function that performs the dynamic API mapping procedure. When this occurs, libraries required by the invoked API are identified 202. Next, these libraries are dynamically loaded 206 into the application, and bound 208 to the associated API function call as described herein. In summary, this is accomplished by loading and linking the required libraries before any APIs are called by calling a special function provided for this purpose, before the application tries to call any TOP END APIs. When this special function is called, all of the libraries are loaded and all APIs in the library are linked. From this point forward, these linked APIs can be called by the application.

Figure 3:
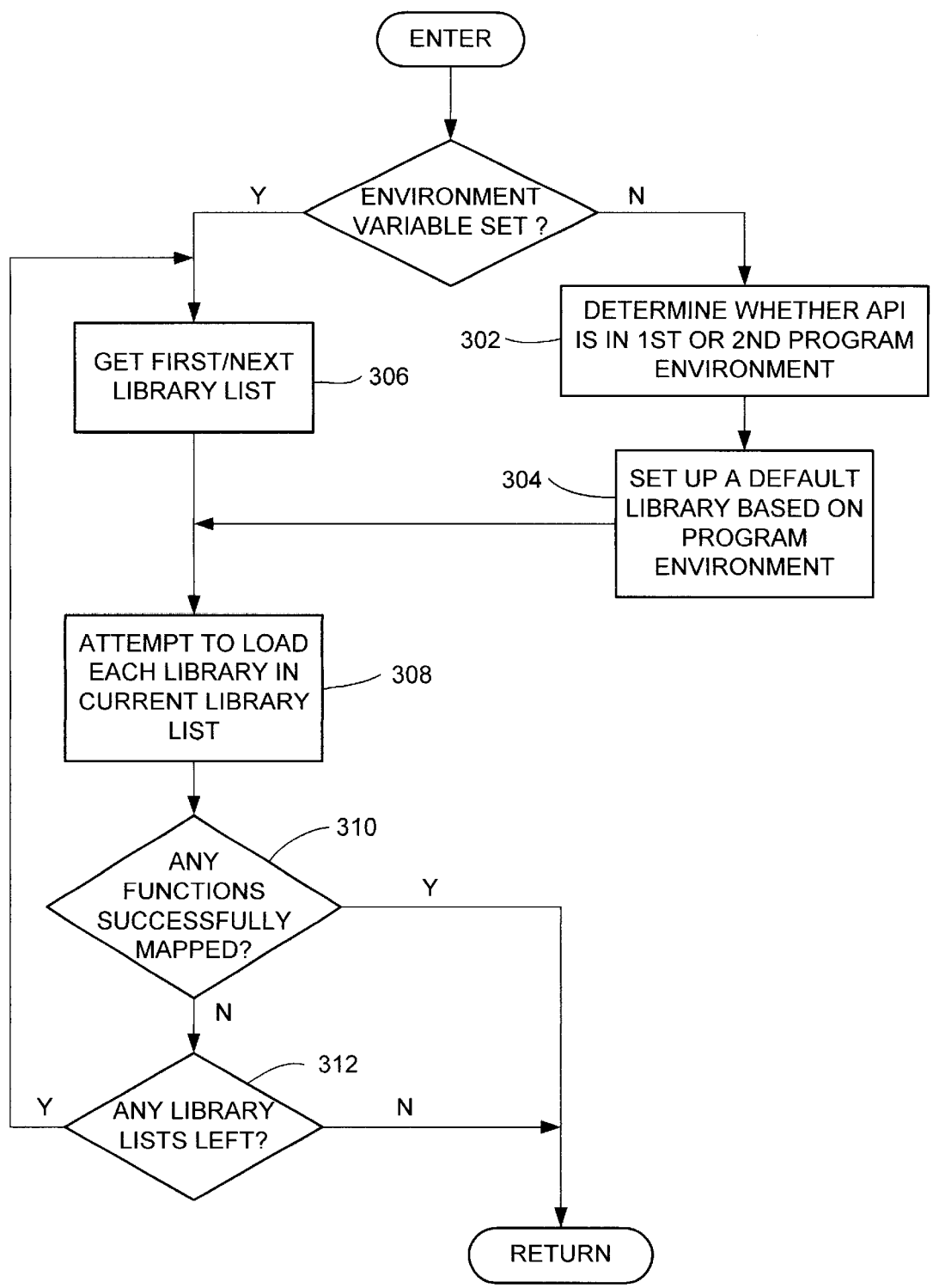
FIG. 3 is a flow chart illustrating the operations performed to identify which libraries are required by an invoked API in the present invention.

FIG. 3 is a block diagram illustrating the process by which one embodiment of the present invention identifies or determines which libraries are required by the invoked API. If an environmental variable is set 300, the remote node 132 determines whether the API is in the first (full-capability or runtime) or second (remote) program environment. This is depicted in block 302. Next, based on the determined program environment, a default library is set up, as shown in block 304. Then, the present invention attempts to load each library in the library list (in this case, the default library list) by scanning the remote node 132 to detect and select libraries that are available, as depicted in block 308.

A single TOP END node may have both TOP END runtime libraries and remote libraries installed. The present invention searches for the installed TOP END packages looking for the run-time libraries first. If they are found, the present invention will attempt to load the TOP END dynamic libraries. If the TOP END run-time libraries are not found, the present invention will attempt to dynamically load the TOP END remote library or libraries.

In one embodiment of the present invention, the user may define a library set for the application component and its associated API to use from a user-definable specified library list. This is signified by setting the environment variable TP_TOPEND_LIBS. This variable can be set to override the default libraries selected above by defining a set of library lists in the following format.

library_list_1[;library_list_2 . . . ]

A library list is a comma-separated list of library names and/or paths, such as:

c:\topend\bin\tpappl.dll,c:\topend\bin\tprtq.dll

The TP_TOPEND_LIBS variable can contain more than one library list, with multiple library lists separated by semi-colons, such as:

c:\topend\bin\tpappl.dll,c:\topend\bin\tprtq.dll;tenrcws.dll

If the environment variable is set 300, the present invention's dynamic API mapping capability will get one or more library lists, and attempt to load each of the libraries in the order listed in the first library list, as shown in blocks 306 and 308, respectively. In one embodiment of the present invention, there may be more than one library on the library list. All libraries in a library list are loaded and linked if possible, and the selection of the library is accomplished in the order specified in the library list. If none of the libraries in a library list are successfully loaded or mapped 310, the libraries in the next library list will be searched. The search stops after all of the libraries in a library list have been searched and when one or more functions are successfully mapped, or when there are no more library lists to search, as indicated by blocks 310 and 312, respectively. If TP_TOPEND_LIBS is not set or full paths are not specified, the mapping facility will search the directory the application was loaded from, the current directory, the system directory, and the PATH environment variable for the appropriate library and dynamically load the library if found.

Figure 4:
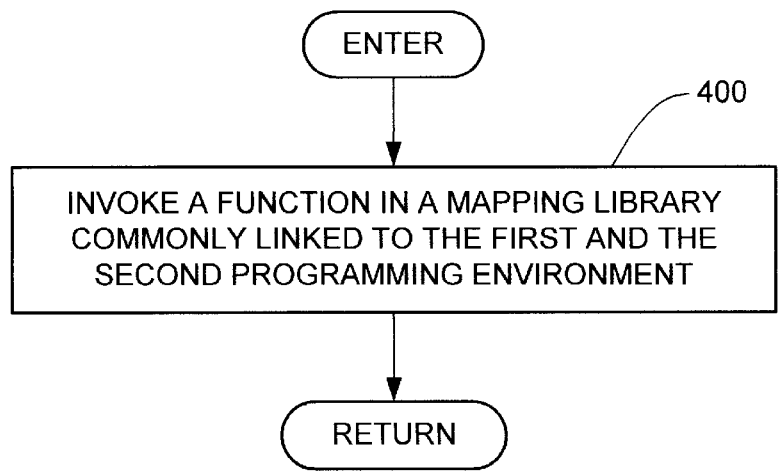
FIG. 4 is a flow chart illustrating the operations performed to determine the environment of the invoked API in the present invention.

FIG. 4 is a flow chart depicting the operations performed to determine whether the API is in the first program environment or in a second program environment. As shown in block 400, in one embodiment, this is accomplished by invoking a function in a dynamic API mapping facility provided by a library commonly linked to both the first programming environment and the second programming environment at compile time. This library is the same regardless of whether the application is in the remote or runtime environment, and each time the application runs, a function in this library is invoked, which dynamically determines whether the application is running in the TOP END runtime or remote environment. This is accomplished by examining the WINDOWS registry for a "TOPENDDIR" entry. If the TOPENDDIR entry exists, and the required runtime libraries exist in the directory specified by the entry, the node is a runtime node 102, 104, 106, and the runtime libraries are loaded. Otherwise, the node is a remote node 132, and the remote libraries 136 are searched for using standard WINDOWS techniques. As described further herein, provision is also made for forcing the application to link with a specific environment.

Figure 5:
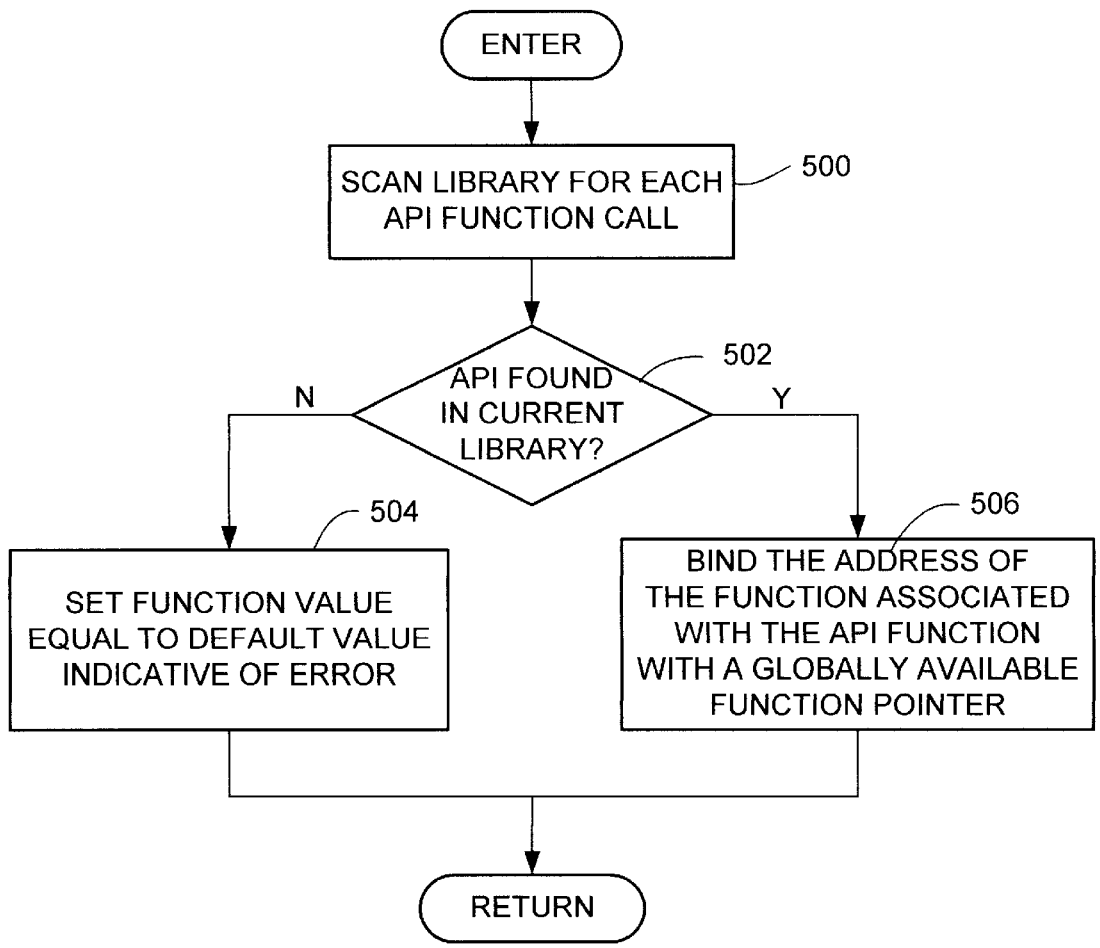
FIG. 5 is a flow chart illustrating the operations performed to bind selected libraries to associated function calls in the present invention.

FIG. 5 is a flow chart depicting the operations performed in binding the selected libraries to the associated API function call. First, the librar(ies) are scanned 500 for each TOP END API function call. Then, if a library for the API function call is found 502, the address of a function associated with the API function is bound with a globally-available function pointer with a name similar to the corresponding API function. This is depicted in block 506. Thus, when the application calls a function via the mapped function pointer, it appears to be calling the function directly, and the application is unaware of which libraries were actually linked. If a library supporting the particular API function call is not found 502, the returned function value is set 504 equal to a default value indicating an error to the user. This feature eliminates the need to check each function pointer for validity before each call.

Conclusion

In summary, the present invention discloses a method, apparatus, and article of manufacture for a software interface for dynamic API mapping. The method comprises the steps of identifying the libraries required by the API by determining which program environment the API is operating in, scanning to detect and select libraries available to the determined program environment, dynamically loading the selected libraries, dynamically loading the selected libraries to the API, and binding the selected libraries to the associated API function call.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of linking an application comprising an applications program interface (API) having at least one function call with a library set implementing the function, comprising the steps of:

identifying the libraries required by the API by determining whether the API is in a first program environment or a second program environment wherein:
said API is a TOPEND API,
said first program environment is a runtime environment,
said second program environment is a remote program environment, and
said determining whether the TOPEND API is in a first or second program environment comprises determining if an environment variable is set, wherein said determining if an environment variable is set comprises examining a registry of an operating system hosting a TOPEND runtime or remote environment to determine if a TOPENDDIR entry exists;

scanning to detect and select libraries available to the determined program environment, wherein said scanning to detect and select libraries available to the determined program environment comprises:
setting up a default library, and
attempting to load each library in a current library list;

dynamically loading the selected libraries into the application; and, binding the selected libraries associated API function call.

2. The method of claim 1, wherein the step of determining whether the API is in a first program environment or a second program environment comprises the step of invoking a function in a mapping library commonly linked to the first and the second program environment when an application associated with the API is executed.

3. The method of claim 1, wherein the libraries required by the API are identified by reading the required libraries from a library list when indicated by an environment variable.

4. The method of claim 3, wherein the required libraries are selected heuristically when indicated by an environmental variable.

5. The method of claim 1, wherein the step of identifying libraries required by the API comprises the step of accessing a default library set.

6. The method of claim 3, wherein the library list is user-definable.

7. The method of claim 1, wherein the step of binding the detected libraries to the associated API function comprises the steps of:

scanning the library for each API function call; and binding the address of the function associated with the API function to a globally available function pointer.

8. The method of claim 7, further comprising the step of setting an address of a function call not found in the scanned library to the address of a second function which returns an error message when called.

9. The method according to claim 1, wherein said current library list includes at least one of TOPEND runtime libraries, remote libraries, and user defined libraries.

10. The method according to claim 1, wherein said step of attempting comprises:

loading and linking each library in an order specified in the library list; and concluding said loading and linking when one or more functions are successfully mapped.

* * * * *

UNITED STATES PATENT AND TRADEMARK OFFICE
CERTIFICATE OF CORRECTION

PATENT NO. : 6,253,257 B1
DATED : June 26, 2001
INVENTOR(S) : Jack P. Dundon

It is certified that error appears in the above-identified patent and that said Letters Patent is hereby corrected as shown below:

<u>Column 4,</u>
Line 57, after "Windows" and before "The" delete "NTTM." and substitute therefor -- NT<sup>TM</sup>. --.

Signed and Sealed this

Nineteenth Day of March, 2002

Attest:

JAMES E. ROGAN
*Director of the United States Patent and Trademark Office*

*Attesting Officer*